United States Patent [19]

Jones

[11] 3,873,629
[45] Mar. 25, 1975

[54] SEPARATION OF CHLORODIFLUOROMETHANE AND HYDROGEN

[75] Inventor: James B. Jones, Wilmington, Del.

[73] Assignee: E. I. DuPont de Nemours and Company, Wilmington, Del.

[22] Filed: Jan. 23, 1974

[21] Appl. No.: 435,871

[52] U.S. Cl............................ 260/653, 55/71, 55/73
[51] Int. Cl............................................... C07c 17/38
[58] Field of Search...................................... 260/653

[56] References Cited
UNITED STATES PATENTS 2,371,341   3/1945   Matuszak............................ 260/653
2,613,232   10/1952  Janoski............................... 260/653

Primary Examiner—Daniel D. Horwitz

[57] ABSTRACT

A continuous process for separating mixtures of hydrogen fluoride and chlorodifluoromethane by countercurrently contacting an upwardly flowing gaseous mixture of these components with downwardly flowing concentrated sulfuric acid wherein the lower region of the zone of contact is about from 25° to 100°C. warmer than the upper region of the zone.

4 Claims, 1 Drawing Figure

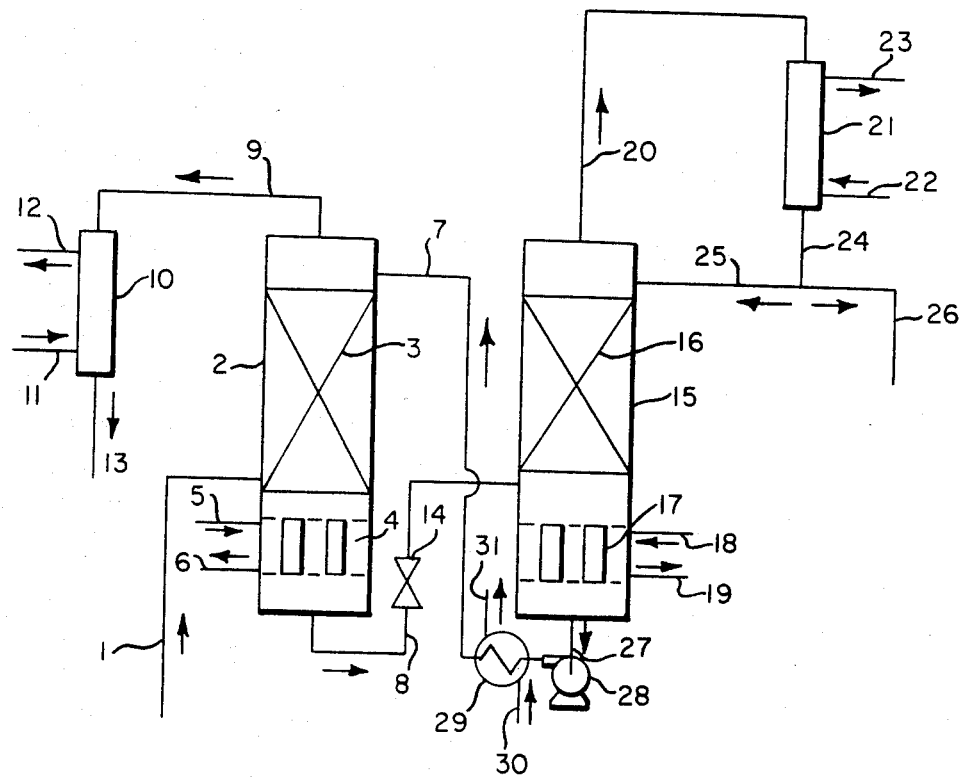

SEPARATION OF CHLORODIFLUOROMETHANE AND HYDROGEN

BACKGROUND OF THE INVENTION

Chlorodifluoromethane, hereinafter FC-22 is an important refrigerant and intermediate in the fluorochemicals industry. FC-22 is a percursor of tetrafluoroethylene which is the principal monomer of chemically and thermally resistant fluoropolymers.

A common process for the manufacture of FC-22 is a continuous catalyzed halogen exchange between chloroform and excess hydrogen fluoride. Continuous distillation of the products of the exchange can provide a stream of FC-22 free of the bulk of hydrogen fluoride, but pure FC-22 cannot be obtained because FC-22 and hydrogen fluoride form a distillatively inseparable azeotrope containing about 3 weight percent of hydrogen fluoride at the usual operating pressures. The composition of this azeotrope is essentially unchanged by pressure at least over the range of about from 4 atmospheres to 17 atmospheres absolute. Since FC-22 substantially free of hydrogen fluoride is normally required in its further reactions as an intermediate, many techniques have been explored for the separation of this azeotrope. For example, it is possible to extract the hydrogen fluoride of the azeotrope with water and thereafter to dispose of the water solution of hydrogen fluoride following neutralization with lime. Routine extraction with sulfuric acid, as used with mixtures of hydrogen fluoride and other halocarbons, is also unsatisfactory, since the solubility of FC-22 in sulfuric acid prevents separation of the components to the extent desired.

SUMMARY OF THE INVENTION

The present invention provides a continuous process for efficiently separating hydrogen fluoride from mixtures of hydrogen fluoride and FC-22 in a large scale operation.

Specifically, the process involves bringing into contact, in a chamber having a lower and an upper end, a downward flowing stream consisting essentially of concentrated liquid sulfuric acid and an upward flowing stream consisting essentially of a gaseous mixture of hydrogen fluoride and FC-22, the chamber being maintained at a temperature above the boiling point of both hydrogen fluoride and FC-22, the lower end of the chamber being maintained at a temperature about from 25° to 100°C higher than the upper end of the chamber; and removing purified FC-22 from the upper end of the chamber and a mixture of concentrated sulfuric acid and hydrogen fluoride from the lower end of the chamber.

BRIEF DESCRIPTION OF THE DRAWING

The FIGURE is a schematic drawing of an apparatus for carrying out the process of the invention, shown together with means for the separation of the mixture of hydrogen fluoride and concentrated sulfuric acid formed in the process of the invention.

DETAILED DESCRIPTION OF THE INVENTION

The process of the invention involves the countercurrent contacting of a gaseous mixture of FC-22 and hydrogen fluoride with liquid concentrated sulfuric acid to produce a first stream consisting essentially of FC-22 and a second stream consisting essentially of a concentrated sulfuric acid solution of hydrogen fluoride, sometimes called fluorosulfuric acid. Thereafter, the second stream can optionally be separated into concentrated sulfuric acid and hydrogen fluoride. The sulfuric acid can be reused in the process of the invention.

The temperature of the chamber in which the counter-current streams are brought into contact is at least higher than the boiling points of the hydrogen fluoride and the FC-22, to assure that these components are in a gaseous state. This temperature, of course, will vary widely depending on the pressure used in the chamber. In addition, an important feature of the process involves maintaining the lower end of the chamber, at which the sulfuric acid mixture is collected, about from 25° to 100°C warmer than the upper end. A temperature gradient of about 75°C within the chamber has been found to be particularly satisfactory, allowing the convenience of adjusting the temperature at the top of the chamber to about 25°C. and heating the lower region of the chamber to about 100°C. with a readily available low pressure steam heater.

The minimum temperature gradient is necessary to minimize FC-22 appearing in the sulfuric acid/hydrogen fluoride mixture, which is normally separated for reuse. If the temperature gradient in the chamber is too low, the concentration of FC-22 in the hydrogen fluoride stream increases to a point where very low temperature refrigeration must be used to condense the products. For example, with no temperature gradient across the zone a brine temperature of −75°C. is required to condense the hydrogen fluoride product stream whereas under the preferred condition of 75°C. gradient across the zone, a brine temperature of −50°C. is sufficient to condense the stream. The cost of refrigeration increases exponentially and inversely with the temperature to which the brine must be cooled. With temperature gradients in the chamber in excess of 100°C, the proportion of hydrogen fluoride removed from the FC-22 will decrease.

The countercurrent streams can be brought into contact in a conventional scrubbing tower filled with packing. The liquid sulfuric acid can be allowed to flow through the packing from the top of the tower while the stream of hydrogen fluoride and FC-22 is passed upward through the tower. While the ratios of sulfuric acid and the FC-22/hydrogen fluoride mixture can vary widely, it is preferred that the weight ratio of the concentrated sulfuric acid stream to the FC-22/hydrogen fluoride stream be about 0.5. This ratio provides for substantially complete removal of the hydrogen fluoride from a mixture with FC-22 with minimal dissolution of the fluorocarbon.

The regulation of temperatures requires also that attention be given to the temperatures of streams feeding the zone and the heat of mixing which is liberated when concentrated sulfuric acid contacts hydrogen fluoride. In a preferred embodiment wherein the weight ratio of flows of the concentrated sulfuric acid stream to the FC-22/hydrogen fluoride stream, is about 0.5, the preferred temperature profile is obtained by feeding the concentrated sulfuric acid stream at 25°C., the FC-22/hydrogen fluoride stream at −4°C. and low pressure steam is used in the heater.

The stream of purified FC-22 is removed from the top of the tower, while a mixture of concentrated sulfuric acid and hydrogen fluoride is removed from the bottom of the tower. The mixture of sulfuric acid and hydrogen fluoride can be separated by conventional distillation techniques, and the resulting concentrated sulfuric acid can be recycled for use in the process of the invention.

The instant process is further illustrated by the drawing, which is a schematic illustration of an apparatus which can be used for the process. In the drawing a stream consisting essentially of FC-22 and hydrogen fluoride in line 1 enters the lower part of tower 2 having packing 3 and a heated section 4 shown as a shell and tube section heated by steam which enters the shell section in line 5 and leaves in line 6. A stream consisting essentially of concentrated sulfuric acid at a temperature less than that of heated section 4 enters tower 2 in line 7. A stream of concentrated sulfuric acid and hydrogen fluoride leaves the tower as bottoms in line 8 and a stream of purified FC-22 leaves the tower in line 9. The FC-22 of line 9 is condensed in condenser 10 which is cooled by fluid entering the shell side of condenser 10 in line 11 and leaving in line 12. The condensed FC-22 of the stream of line 9 leaves the process in line 13.

The FIGURE also shows an optional system for the separation of the sulfuric acid-hydrogen fluoride mixture. In this system, the stream of line 8 passes through letdown valve 14 and enters vacuum distillation column 15 having packing 16 and a heated section 17 shown as a shell and tube section heated by steam entering the shell section in line 18 and leaving in line 19. Any FC-22 present in the stream volatilizes and passes as overhead through line 20 to condenser 21 which is cooled by fluid entering the shell side in line 22 and leaving in line 23. The condensate therefrom in line 24 which consists essentially of hydrogen fluoride is divided, a part being returned to column 15 through line 25 as reflux. The other part of the condensate is removed from the process in line 26.

A stream consisting essentially of concentrated sulfuric acid is removed as bottoms from column 15 in line 27. Pump 28 moves the stream through heat exchanger 29 cooled with fluid entering in line 30 and leaving in line 31. Thereafter the stream re-enters tower 2 through line 7.

The process of the instant invention is applicable to a wide range of compositions of FC-22 and hydrogen fluoride, with routine adjustments of conditions according to the particular mixtures involved. Because of the difficulty in separating the components of an azeotrope of hydrogen fluoride and FC-22, the process is particularly well suited for the separation of these mixtures containing about 3 weight percent of hydrogen fluoride. Under the preferred conditions using a temperature gradient of about 75°C., the proportion of hydrogen fluoride remaining in the FC-22 after processing is about 0.2 percent by weight, and the amount of FC-22 taken from the system in the sulfuric acid/hydrogen fluoride mixture is minimal. While the mechanism of the present purification process is not fully understood, it is believed to be a function of extraction and distillation phenomena.

EXAMPLE

An apparatus of the type illustrated in the FIGURE is used for the separation of an azeotrope of FC-22 and hydrogen fluoride containing about 3 weight percent hydrogen fluoride. The weight ratio of the streams of concentrated sulfuric acid to the azeotrope of FC-22 and hydrogen fluoride is 0.5.

Using the temperature, pressure and feed conditions set forth in the following table, purified FC-22 having only about 0.2 weight percent hydrogen fluoride is recovered. Even these small traces of hydrogen fluoride in the FC-22 product can be removed by water scrubbing or by fractional distillation to produce a stream of pure FC-22 and a stream of FC-22/hydrogen fluoride azeotrope which can be returned to the process. The hydrogen fluoride stream of line 26 is of sufficient purity for use in the halogen exchange reaction with chloroform to produce FC-22. The hydrogen fluoride can be further purified, if desired, by fractional distillation which produces a stream of pure hydrogen fluoride and a stream of FC-22/hydrogen fluoride azeotrope which can be returned to the process.

TABLE

| Part or Line No. | Stream | Principal Components (wt. %) | | | Temp. (C°) | Press. (Kg/Cm² Abs) |
|---|---|---|---|---|---|---|
| 1 | Azeotrope | FC-22 HF | | 97 3 | −4 | 3.5 |
| 4 | (Heater) | — | | | 100 | — |
| 7 | H₂SO₄ inlet | Conc. H₂SO₄ HF | | 95 5 | 25 | 3.5 |
| 8 | H₂SO₄/HF | Conc H₂SO₄ HF FC-22 | | 89 10 1 | 100 | 3.5 |
| 11 | Brine | — | | | −18 | — |
| 13 | Recovered FC-22 | FC-22 HF | | 99.8 ~0.2 | −7 | 3.4 |
| 17 | (Heater) | — | | | 100 | — |
| 22 | Brine | — | | | −55 | — |
| 26 | Recovered HF | HF FC-22 | | 84 16 | | 215 mm. Hg. |

We claim:
1. A process comprising bringing into contact, in a chamber having a lower and an upper end, a downward flowing stream consisting essentially of concentrated liquid sulfuric acid and an upward flowing stream consisting essentially of a gaseous mixture of hydrogen fluoride and chlorodifluoromethane, the chamber being maintained at a temperature above the boiling point of both hydrogen fluoride and chlorodifluoromethane, the lower end of the chamber being maintained at a temperature about from 25 to 100 Centigrade degrees higher than the upper end of the chamber; and removing purified chlorodifluoromethane from the upper end of the chamber and a mixture of concentrated sulfuric acid and hydrogen fluoride from the lower end of the chamber.

2. A process of claim 1 wherein the temperature of the lower end of the chamber is about 75°C higher than the upper end.

3. A process of claim 2 wherein the lower end of the chamber is maintained at a temperature of about 100°C.

4. A process of claim 1 wherein the mixture of chlorodifluoromethane and hydrogen fluoride comprises about 3 weight percent hydrogen fluoride.

* * * * *